Jan. 26, 1937. G. F. FRENCH Re. 20,257

LADDER WEB OF VENETIAN BLINDS

Original Filed May 11, 1932 4 Sheets-Sheet 1

Inventor:-
Geo. Frederick French

By his Attorney:- Walter Guss.

Jan. 26, 1937. G. F. FRENCH Re. 20,257

LADDER WEB OF VENETIAN BLINDS

Original Filed May 11, 1932 4 Sheets-Sheet 2

Inventor:—
Geo. Frederick French
Walter Lunn

By his Attorney:—

Jan. 26, 1937. G. F. FRENCH Re. 20,257

LADDER WEB OF VENETIAN BLINDS

Original Filed May 11, 1932 4 Sheets-Sheet 3

Inventor:-
Geo. Frederick French
By his Attorney:- Walter Gunn.

Jan. 26, 1937. G. F. FRENCH Re. 20,257

LADDER WEB OF VENETIAN BLINDS

Original Filed May 11, 1932 4 Sheets-Sheet 4

Inventor:-
Geo. Frederick French

By his Attorney:- Walter Gunn

Reissued Jan. 26, 1937

Re. 20,257

UNITED STATES PATENT OFFICE 20,257

LADDER WEB OF VENETIAN BLINDS

George Frederick French, Manchester, England, assignor to Thomas French & Sons Limited, Manchester, England Original No. 1,980,048, dated November 6, 1934, Serial No. 610,565, May 11, 1932. Application for reissue October 21, 1936, Serial No. 106,928. In Great Britain June 16, 1931

9 Claims. (Cl. 242—55)

The present invention is directed to ladder web, more particularly to the reeling thereof to avoid distortion thereof.

Venetian blind ladder web as it comes from the loom is wound into reels, each reel containing about 72 yards. The reeling of the web is usually done in a power-driven machine comprising a half-inch spindle, with fast and loose pulleys, and with discs to form the sides of the channel in which the web is reeled. The end of the web is secured to the spindle and the web is tightly coiled as the spindle is rotated.

The ladder web is composed of two outer thicknesses (usually about 1½" wide) joined at intervals by pairs of inner and narrow cross-tapes, (usually ⅜" wide), the cross-tapes, lying side by side (offset) being interwoven with the outer thicknesses in sandwich form. To make the web marketable, certain superfluous weftless threads of the cross-tapes which join the two outer thicknesses have to be cut away. In order to make the cutting easy, the web is first wound onto a reel in the manner described, and after cutting said threads, which leaves the web loose, the web is usually rewound, the second winding being on to a small wood center block of a diameter of about 1½", which remains in the reel.

Ladder web requires to be made and reeled so that the web when used shall support the laths or slats of a Venetian blind at the proper angle with all the laths parallel with and equidistant from one another, and, therefore, the reeling of the web must be such that the correct (or original) relationship between the two outer thicknesses and between the cross-tapes and said thicknesses shall be maintained undisturbed, if the whole of the web is to be usable.

Heretofore, the reeling of ladder web as commonly practised, has not been successful in maintaining the original relationship between the outer thicknesses and the cross-tapes, for the whole length of the web, portions of the web from the inner end being distorted and permanently damaged, with consequent waste of material. When the web is re-reeled after cutting and the earlier outside end is reeled on the spindle, portions (several yards) of the web of both ends get permanently damaged.

The object of this invention is to reel (or re-reel) ladder web without damage to any portion of its entire length and thus avoid waste.

My invention is based on the discovery that the damage was not due to inequalities or defects introduced in the weaving operation which was previously thought to be the cause, but was due to the reeling of the web on a smaller diameter core, which caused a relative compression of the inner of the two outside main tapes and a puckering thereof, especially at the points where the cross-tapes are secured to the main tapes. I, thereupon, increased the diameter of the core and found that the damage could be prevented when the proper diameter was obtained.

According to the invention, instead of reeling the web upon a relatively small centre block, it is reeled upon a relatively large block, or ring, both prior to and after cutting the superfluous threads to allow the separation of the webs, the diameter of the block or ring being equivalent to the size of coil at which, using the ½" spindle, the layers or thicknesses of the web cease to coil in other than a regular (non-distorted) relationship.

In one example of the invention, a centre block of 5" diameter and 1½" wide is used. With such enlarged block, it is found that any length of web can be reeled without any portion being damaged.

An explanation of the even reeling (and in determination of the "relatively large" diameter of block to be used) is that the outer and inner thicknesses of the web, while free to stretch or contract, are only required to do so to such a small degree that the two outer webs particularly can regain naturally their former relationship to each other when the web is unwound or is flat or suspended in a straight line, i. e. that the webs are not stretched beyond their capacity to regain their former or original woven state. Thereby permanent relative displacement of the two thicknesses is prevented thus producing the even reeling referred to, and the said stretch or contraction required is not in excess of the limit of elasticity of the material or the point of breaking down of the yarn fibers, and does not therefore cause permanent change in gauge, i. e. the distance between the cross tapes. The diameter of the centre block or ring may vary with the thickness or quality of the ladder web, which factors determine the relative movement between the said thicknesses. The 5" block is suitable for a ladder tape which winds on about 16 coils per inch radius.

The invention will be further described with reference to the accompanying drawings, wherein.

Figure 6:
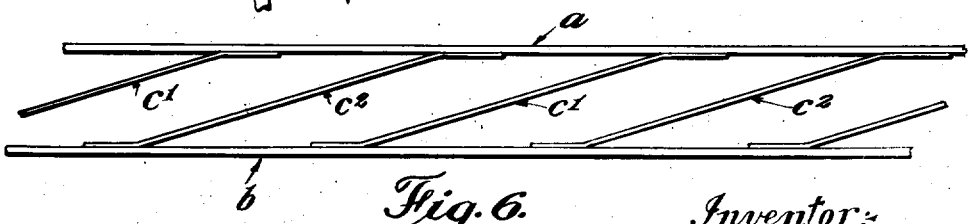
Fig. 6 is a side or edge view of a short length of Venetian blind ladder web.

As shown in Fig. 6, a ladder web consists of two outer broad tapes, *a*, *b*, and a series of intermediate narrow cross-tapes $c^1$, $c^2$, and cross-tapes $c^1$, lying near to one edge of the tapes *a*, *b* and the cross-tapes $c^2$ lying near to the opposite edge of the tapes *a*, *b*.

In reeling the ladder according to the ordinary method, one end of the web is attached to a small diameter wood block and when the desired length is reeled the block and the reeled web are removed from the reeling mechanism and the web is ready to be packed for storage or shipment and ultimate sale. Owing to the tension on the outer tape being greater than the tension on the inner tape due to the difference in circumference of the reeled web, the tape gets puckered or rucked or the outer web gets unduly stretched beyond its capacity to regain its former or natural state or both. The present invention which is designed to overcome this puckering or rucking consists in reeling the weight on a roller or ring of a diameter corresponding to the diameter at which the tension of the tapes *a*, *b* due to reeling, is more or less equal, or the outer tape does not get stretched beyond its capacity to regain such stretch when the reel is unwound.

Figures 1, 2:
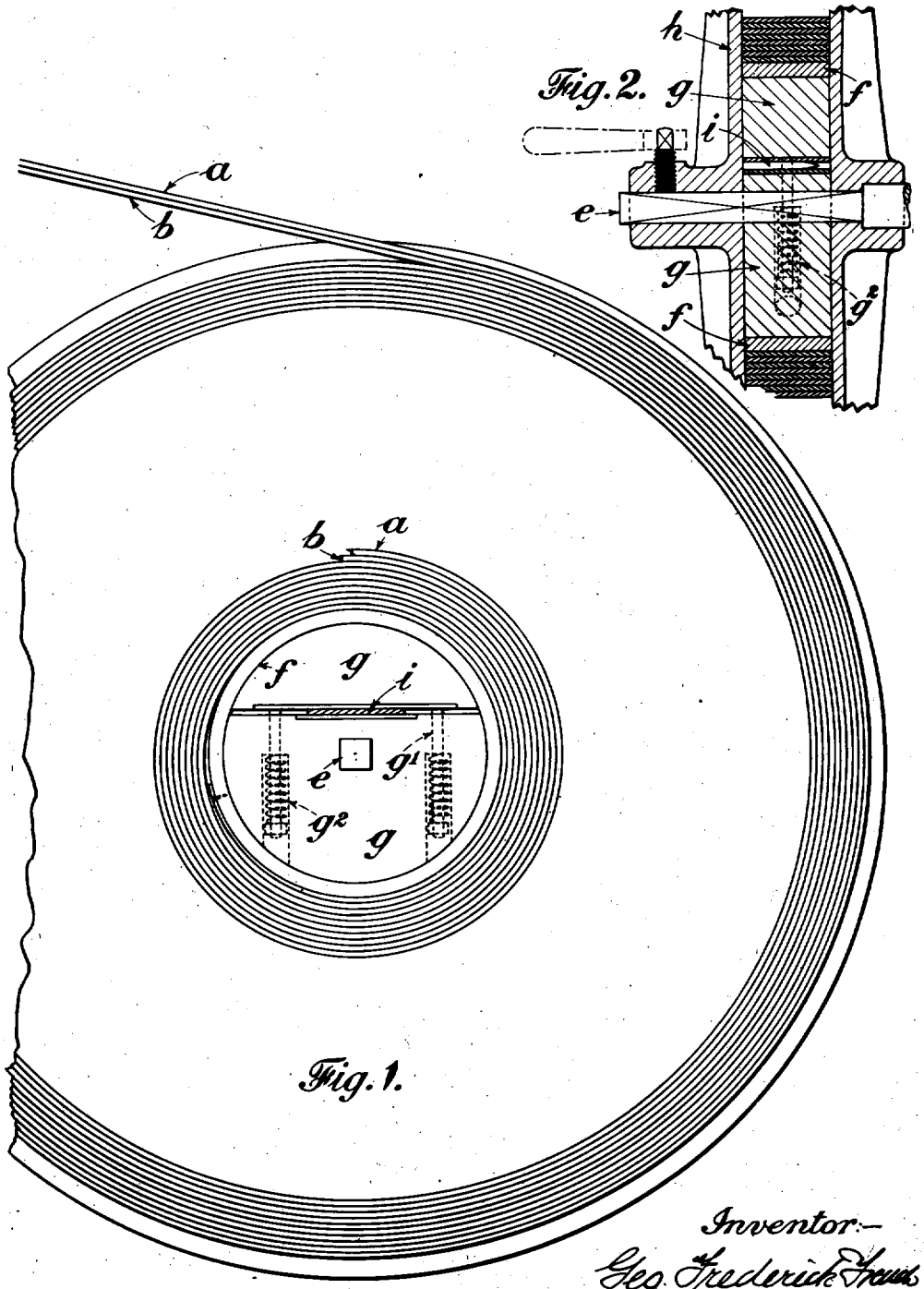
Fig. 1 is a side elevation, partly broken away, of a ladder web reeled according to the invention, and an end view of reeling apparatus used in reeling the web.
Fig. 2 is a cross-section of the example of reeling apparatus shown in Fig. 1.

In the drawings (Figs. 1 and 2), the roller or ring is in the form of an annular cardboard or like ring *f*, which is equal in width to the width of the web, and is mounted sleeve-fashion on a two-part annular block *g*. One, the larger, part of the block is mounted on the machine spindle *e*, and the other and smaller part is held to the larger part by spindles $g^1$ slidably fitting holes in and engaging springs $g^2$ within the said larger part. The opposed surfaces of said parts of the block are preferably metal faced. Attached to the disk *h*, which closes in the block and web during the reeling operation, is a wedge-like metal blade *i*, which, on the disc being placed on the spindle, passes between the two parts of the block *g* and causes the smaller part to move radially and bind upon the interior of the ring *f*, and thereby firmly hold the same to the block. The disc *h* is held to the spindle *e* by a nut, or cotter.

The ladder web to be reeled is preferably tacked at one end to the ring *f* and the reeling proceeds in the usual manner as the spindle, block and ring rotate, but without any rucking of any part of the inner tape *b*, or overstretching of outer web *a*.

Figure 3:
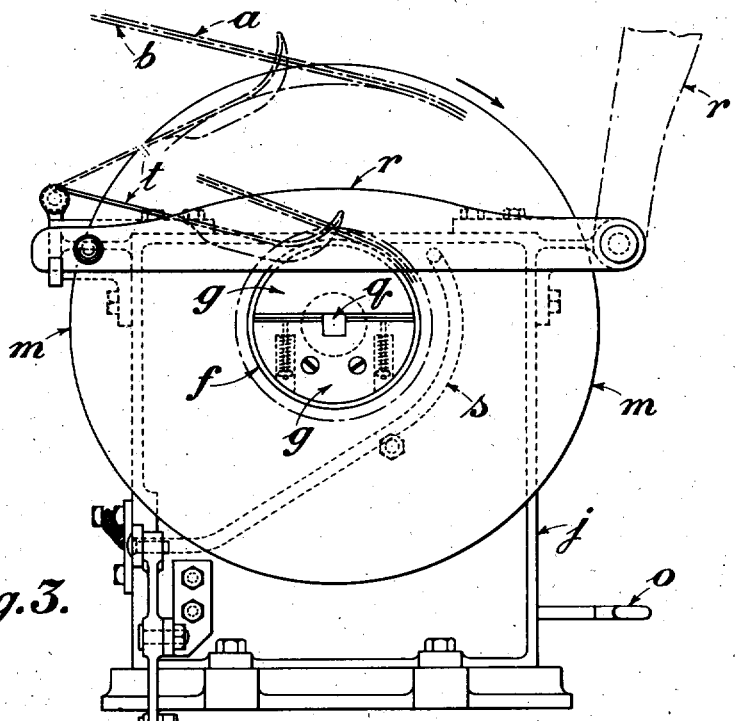
Fig. 3 is a side view.
Figure 5:
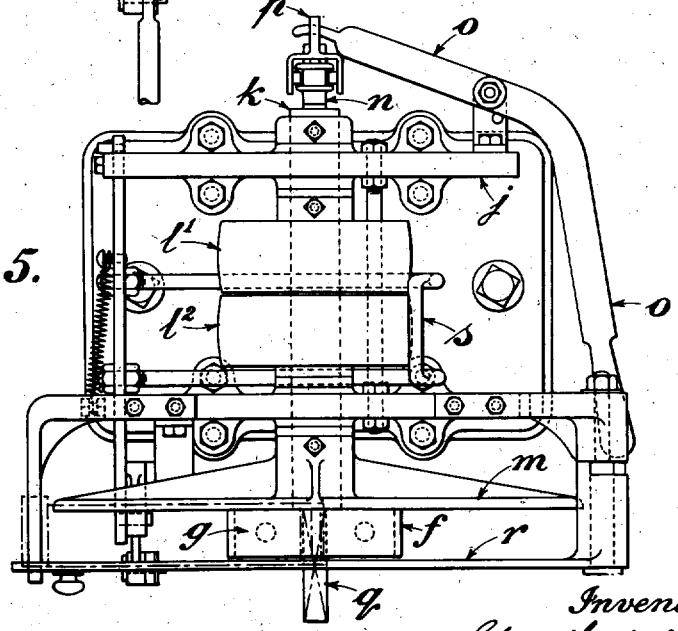
Fig. 5 is a plan of a machine embodying a further example of reeling apparatus and suitable for carrying out the improved reeling operation.
Figure 4:
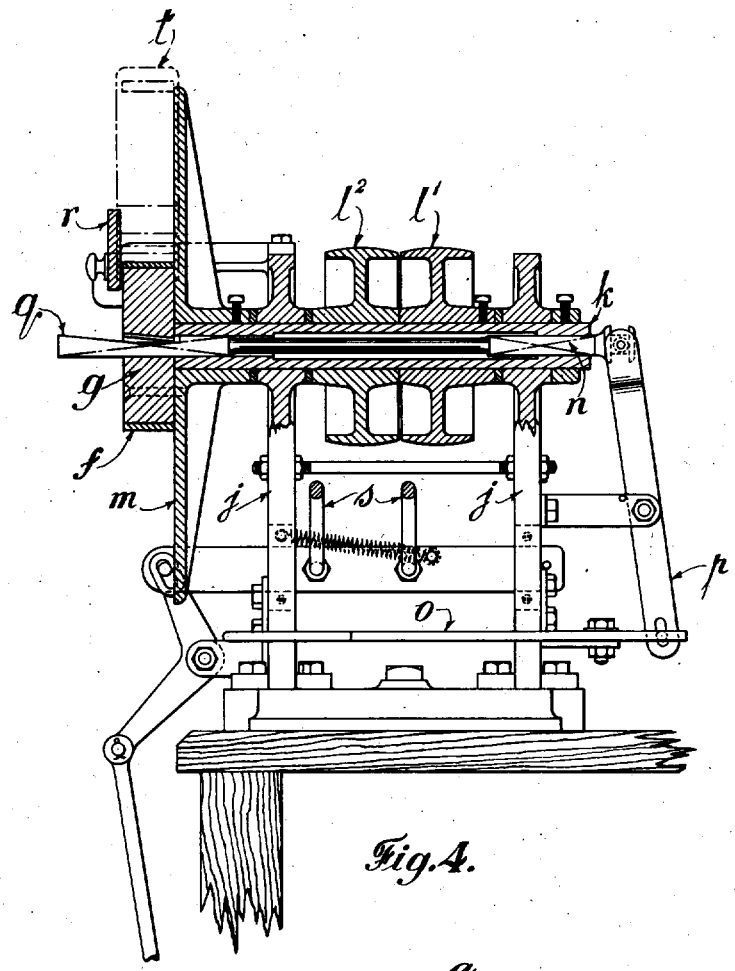
Fig. 4 is a longitudinal sectional elevation.

In Figs. 3, 4 and 5 a machine is shown designed to facilitate the operations of placing the ring *f* on the block *g*, separating the parts of the block to fix the ring, and guiding the tape as it is reeled.

Such machine comprises a pair of frames *j* supporting a hollow power shaft *k* fitted with fast and loose pulleys $l^1$, $l^2$ and with a large metal disc *m*. Slidably mounted in the shaft *k* is a spindle *n*, which extends at each end beyond the ends of the shaft. Said spindle, and the bore of the shaft, are rectangular in cross section at their ends, and the spindle, whilst free to slide endwise, is rotated by the shaft, at one end of the spindle is operably coupled with a hand lever *o* through collars *p*, and at its other end the spindle is of wedge shape, the wider part being further from the central part of the spindle, see Fig. 4. By moving the hand-lever *o* in one direction, the spindle draws the bar *q* towards the machine and separates the two parts of the block *g* surrounding the bar, which thereby engage the ring *f* to hold the same to the bar.

A broad, plate-like hand-lever *r* is pivoted at one end to the machine frame, and is adapted, in one position, to lie alongside the ring *f* and block *g* and take the place of the removable disc aforesaid. When raised to the dotted position (see Fig. 3), the lever *r* allows of the ring and reel being removed from the machine.

A sliding belt-shifter *s* is provided for moving the driving belt on to and off the fast and loose pulleys $l^1$, $l^2$, and such belt-shifter is operated by a spring-balanced foot-treadle (not shown). The machine will usually be mounted on a bench, and the foot-treadle will be situated at the foot of the bench.

By employing the lever *r*, in place of the removable disc, the operator can more readily and rapidly control the various operations necessary to carry out the reeling of the ladder web.

To guide the web as it is being reeled, a hinged bar *t* may be provided, which at its free end has a slot through which the web passes, see Figs. 3 and 4, and by which the reel is consolidated as the reeling proceeds.

Figure 7:
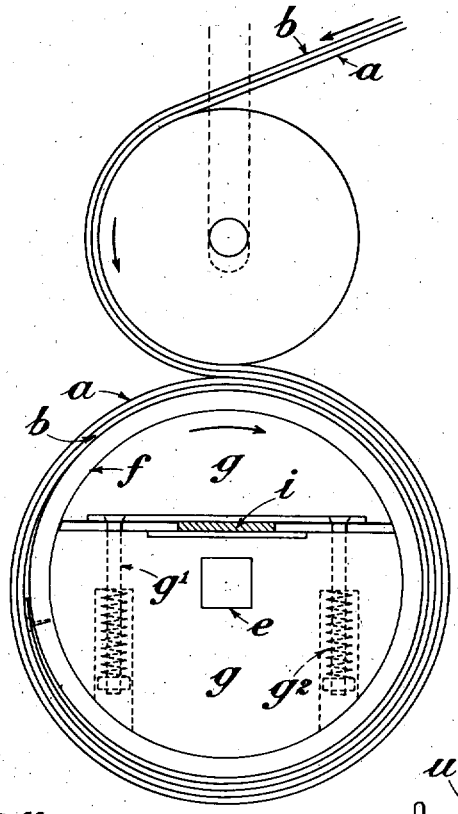
Fig. 7 is a side view of a modification.

The correct coiling of the web may be assisted by passing the web around another roller preceding the reeling block, see Fig. 7, the web being taken half way around the roller to give it an initial reverse curvature, which helps to negative any displacement in reeling.

Figure 8:
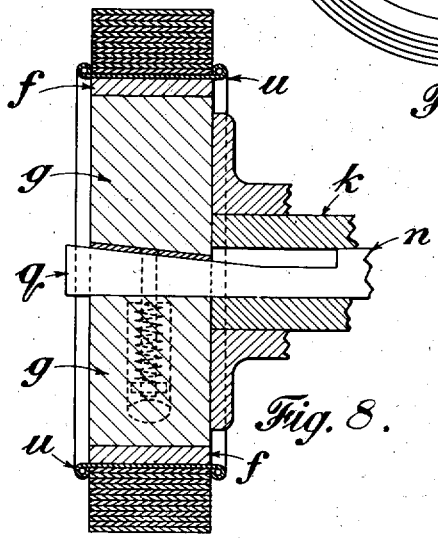
Figs. 8 and 9 are cross sections of further modifications.
Figure 9:
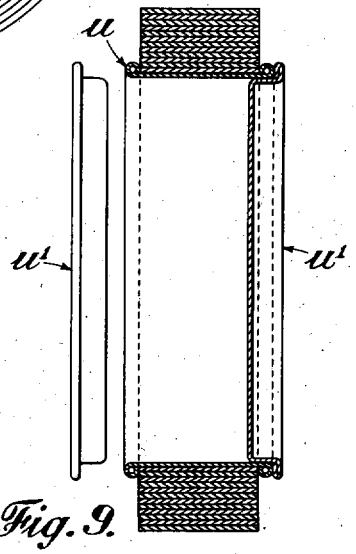

The ring *f* may be replaced by a sheet metal cylindrical box *u* with removable ends $u^1$, see Figs. 8 and 9, so that after use as a core for the reel, the box may be used for other purposes. The end of the ladder web will be fixed to the box by split pins passing through holes in the periphery of the box, or by the end of the web being made to loop around the box.

What I claim is:—

1. The process of reeling Venetian blind ladder web or the like having two similar broad main tapes and provided with inter-connecting cross-tapes between the main tapes at intervals in its length, wherein the reeling is commenced on a diameter of reel at which the difference in length of the two main tapes of the web for any angle of arc is within the elastic limit of the web, whereby the web may be reeled and rereeled without permanent distortion of the parts of the web, and the parts of the web when the latter is removed for use, will automatically resume their normal initial relative positions.

2. An apparatus for reeling Venetian blind ladder web, comprising a power shaft, a pair of machine frames forming bearings for said shaft, a disc mounted on and rotating with said shaft, a circular expandible reeling block carried by and rotating with said shaft, said block being composed of two segments with means to yieldingly draw said segments together, an open-ended sleeve surrounding the block, and a wedge member also carried by the shaft in the rotation thereof and passing between the segments of the block to separate them and force them against the interior face of the sleeve, and a member extending across the disc in spaced relation with the same to guide the web while being reeled, as herein set forth.

3. An apparatus for reeling Venetian blind ladder web comprising a hollow power shaft, a pair of machine frames forming bearings for said shaft, a disc keyed to one end of the shaft, a spindle extending through the said shaft and projecting at each end beyond the ends of the shaft, means including an operating lever for moving the spindle endwise, said spindle and the bore of the shaft at their ends being rectangular in cross section, and one end of the spindle being wedge-shape longitudinally, the wider part being furthest from the central part of the spindle, a circular expandible reeling block on said wedge-shaped end of the spindle, the block being composed of two segments, and means for holding the segments yieldingly together, an open-ended and removable sleeve surrounding the said block and normally held to the block when the latter is expanded, the expansion being effected by the wedge-shaped part of the spindle on the latter being moved endwise, a pivot carried by one of the machine frames, a plate mounted on said pivot and normally lying across one end of said sleeve, a hook-like fitting extending from the adjacent machine frame with which said plate may engage to hold the same in position during the reeling operation, but allow said plate to be raised about its pivot when requiring to remove the reel of tape and sleeve from the block, as herein set forth.

4. An apparatus for reeling Venetian blind ladder web, comprising a spindle, bearings for said spindle, means for rotating the spindle, a circular expandible block detachably keyed to said spindle, said block being composed of two segments, means for holding said segments yieldingly together, an open-ended sleeve surrounding the block, a disc to right and left of the block also detachably keyed to the spindle, and one of said discs having on one side a wedge-like lateral projection lying between the segments of the block and serving to separate same and firmly hold the sleeve to the block, as herein set forth.

5. An apparatus for reeling Venetian blind ladder web comprising a power shaft, a pair of machine frames forming bearings for said shaft, a disk mounted on and rotating with said shaft, a circular expanding reeling block carried by and rotating with said shaft, said block being composed of two segments and provided with means for yieldingly drawing said segments together, an open ended sleeve surrounding the block, and a wedge member also carried by the shaft in the rotation thereof and lying between the segments of the block and movable inwardly to separate the segments of the block for firmly holding the sleeve on the block.

6. An apparatus for reeling Venetian blind ladder web comprising a power shaft, a pair of machine frames forming bearings for said shaft, a disk mounted on and rotating with said shaft, a circular expanding reeling block carried by and rotating with said shaft, said block being composed of two segments and provided with means for yieldingly drawing said segments together, an open ended sleeve surrounding the block, a wedge member also carried by the shaft in the rotation thereof and lying between the segments of the block and movable inwardly to separate the segments of the block for firmly holding the sleeve on the block, and removable means carried by the shaft in the rotary movement thereof and located at the outer end of the open ended sleeve and cooperation with the said disk for forming a guide for the web.

7. A Venetian blind ladder web or the like having two similar broad main tapes and provided with inter-connecting cross-tapes between the main tapes at intervals in its length a ring, said ladder web being reeled on said ring, the diameter of said ring being such that the difference in length of the two main tapes of the web in proximity to said ring is within the elastic limit of the web, whereby the web may be reeled and rereeled without permanent distortion of the parts of the web, and the parts of the web when the latter is removed for use, will automatically resume their normal initial relative positions.

8. A Venetian blind ladder web or the like having two similar broad main tapes and provided with inter-connecting cross-tapes between the main tapes at intervals in its length a ring, said ladder web being reeled on said ring, the diameter of said ring being such that the difference in length of the two main tapes of the web in proximity to said ring is such that permanent relative displacement of the two is substantially prevented, whereby the web may be reeled and rereeled without permanent distortion of the parts of the web, and the parts of the web when the latter is removed for use, will automatically resume their normal initial relative positions.

9. A Venetian blind ladder web or the like having two similar broad main tapes and provided with inter-connecting cross-tapes between the main tapes at intervals in its length a ring, said ladder web being reeled on said ring, the diameter of said ring being approximately 5'' for a web which winds on about 16 coils per inch radius, so that the difference in length of the two main tapes of the web in proximity to said ring is within the elastic limit of the web, whereby the web may be reeled and rereeled without permanent distortion of the parts of the web, and the parts of the web when the latter is removed for use, will automatically resume their normal initial relative positions.

GEORGE FREDERICK FRENCH.